(12) United States Patent
Lombard et al.

(10) Patent No.: US 8,375,698 B2
(45) Date of Patent: *Feb. 19, 2013

(54) METHOD FOR REDUCING THE VIBRATION LEVELS OF A PROPFAN OF CONTRAROTATING BLADED DISKS OF A TURBINE ENGINE

(75) Inventors: Jean-Pierre Francois Lombard, Pamfou (FR); Jerome Talbotec, Combs la Ville (FR)

(73) Assignee: SNECMA, Paris (FR)

( * ) Notice: Subject to any disclaimer, the term of this patent is extended or adjusted under 35 U.S.C. 154(b) by 725 days.

This patent is subject to a terminal disclaimer.

(21) Appl. No.: 12/548,040

(22) Filed: Aug. 26, 2009

(65) Prior Publication Data
US 2010/0050594 A1 Mar. 4, 2010

(30) Foreign Application Priority Data
Aug. 27, 2008 (FR) ..................................... 08 55756

(51) Int. Cl.
*F01D 25/04* (2006.01)
*F02K 3/072* (2006.01)
*B21K 25/00* (2006.01)
(52) U.S. Cl. ........................................ 60/204; 29/889.21
(58) Field of Classification Search .................. 29/889, 29/889.2, 889.21, 889.3; 60/226.1
See application file for complete search history.

(56) References Cited

U.S. PATENT DOCUMENTS

| 4,947,642 A * | 8/1990 | Grieb et al. .................. 60/226.1 |
| 5,993,161 A | 11/1999 | Shapiro |
| 2008/0206058 A1 | 8/2008 | Dupeux et al. |

FOREIGN PATENT DOCUMENTS

| FR | 2 824 597 | 11/2002 |
| GB | 1084184 | 9/1967 |

OTHER PUBLICATIONS

U.S. Appl. No. 12/548,008, filed Aug. 26, 2009, Lombard, et al.

* cited by examiner

*Primary Examiner* — Ted Kim
(74) *Attorney, Agent, or Firm* — Oblon, Spivak, McClelland, Maier & Neustadt, L.L.P.

(57) ABSTRACT

A method for reducing the vibration levels likely to occur, in a turbine engine including a first and a second bladed disk forming a propfan of contrarotating disks, when the two disks are traversed by a gaseous fluid, because of the turbulence of aerodynamic origin generated by the second bladed disk on the first bladed disk is disclosed. The method includes defining an initial configuration of the blades, calculating the synchronous forced response on the first bladed disk as a function of the harmonic excitation force generated by the second bladed disk expressed as a linear function of the generalized aerodynamic force for the mode in question; for stacked sections of one of the two disks, determining a tangential geometric offset value θ of the individual aerodynamic profile to reduce the term corresponding to the generalized aerodynamic force; and applying a new configuration to the blades.

6 Claims, 2 Drawing Sheets

METHOD FOR REDUCING THE VIBRATION LEVELS OF A PROPFAN OF CONTRAROTATING BLADED DISKS OF A TURBINE ENGINE

The present invention relates to the field of turbine engines and its object is a method making it possible to reduce the vibrations on the blades of bladed disks subjected to a periodic excitation resulting from the turbulence in the gaseous flow passing through the turbine engine, generated by the obstacles close to the disks. The present invention relates more particularly to the assemblies formed by two moveable, adjacent and contrarotating bladed disks.

BACKGROUND OF THE INVENTION

A turbine engine comprises one or more rotors formed of bladed disks, that is to say of blades mounted on a disk that is able to rotate about a shaft, and one or more vanes formed of bladed disks that are fixed, that is to say that do not rotate relative to the above shaft. The blades of the fixed and mobile disks are traversed by a gaseous fluid in a general direction parallel with the shaft. One of the main sources of excitation of the fixed or mobile blades originates from the wakes and from the pressure fluctuations generated by the obstacles adjacent to the blading. These various obstacles, namely the blades of the upstream and downstream stages, or else the casing arms induce turbulence in the flow of the fluid through the bladings. The movement of the blades in this turbulence creates a synchronous harmonic excitation of the rotation speed of the rotor and generates an instationary pressure field on the surface of the blade. The object of the present invention is therefore the attenuation of the impact of the interactions between two moveable bladed disks, one placed immediately downstream of the other and rotating in directions opposite to one another.

In the field of aviation turbine engines, the bladings are particularly sensitive parts because they must satisfy, in terms of design, imperatives of aerodynamic and aeroacoustic performance and of mechanical strength in rotation, temperature and aerodynamic load. All of these aspects mean that these structures are fairly statically loaded and that, because of the imperatives of service life, the amplitudes of vibrations that they sustain must remain low. Furthermore, the aeroelastic coupling, that is to say the coupling between the dynamics of the bladed disks and the fluid flow, is conditional upon the vibrational stability of the structure.

In the context of the design of a turbine engine, and because of the multidisciplinarity of those involved, the design process is iterative. The vibrational design is carried out in order to prevent the presence of critical resonances in the operating range of the machine. The assembly is validated at the end of the design cycle by an engine test in which the vibrational amplitudes are measured. High vibrational levels associated either with resonances or with vibrational instabilities sometimes occur. The fine-tuning of the rotor concerned must then be repeated, which is particularly protracted and costly.

The object of the present invention is to control, right at the design or development phase of the machine, the levels of vibrational response of the bladed disks in a turbine-engine structure comprising at least a first moveable bladed disk and a second moveable bladed disk which are contrarotating and traversed by a gaseous flow.

DESCRIPTION OF THE PRIOR ART

Patent GB 1084184 describes a turbofan engine comprising a propfan of contrarotating bladed disks. Mentioned therein is a means of reducing the vibration levels consisting in producing the disks with different numbers of blades.

SUMMARY OF THE INVENTION

The object of the invention is therefore the treatment of vibrations generated by the turbulence generated by one of the disks in the gaseous flow on the other bladed disk. It is aimed at the turbulence generated on the gaseous flow by the wake of a bladed disk or the pressure fluctuations generated by the downstream disk; this turbulence produces vibrations on the moveable bladed disk situated downstream.

The object of the present invention is not limited to the control of the vibration levels in a configuration in which the bladed disks are adjacent; its object is the control of the vibrational responses on a bladed disk for turbulence having its origin upstream or downstream of the bladed disk without being limited to the adjacent disks.

A further object of the invention is the achievement of a method which makes it possible to take the corrective measures that are required as early as possible or as far upstream as possible in the process of designing and fine-tuning turbine-engine contrarotating bladed disks.

A more particular objective of the invention is to reduce the synchronous vibration levels of the rotation speed of the rotor on a bladed disk that is moveable, generated by the relative movement of the wakes or the distortion induced by a bladed disk that is adjacent or that is one or two stages away, upstream or downstream.

According to the invention, the method for reducing the vibration levels likely to occur, in a turbine engine comprising at least a first bladed disk and a second bladed disk forming a prop fan of contrarotating disks, when the two disks are traversed by a gaseous fluid, because of the turbulence of aerodynamic origin generated by the second bladed disk on the first bladed disk, is noteworthy in that it comprises the following steps during the design of said two bladed disks:

A—an initial configuration of the blades is defined as a function of the expected performance of the turbine engine, with the individual aerodynamic profiles of p sections stacked radially between the root and the tip of said blades;

B—the synchronous forced response $y(\omega)$ is calculated on the first bladed disk as a function of the harmonic excitation force $f(\omega)$ generated by the second bladed disk based on the relation $y(\omega)=F(^\tau y_\upsilon * f(\omega))$, where F is a linear function of the generalized aerodynamic force $^\tau y_\upsilon * f(\omega)$ for the mode $\upsilon$ in question;

C—a coefficient ($\alpha<1$) of reduction of the synchronous forced response $y(\omega)$ is defined;

D—for the individual aerodynamic profile of each of said p stacked sections of one of the two disks, a tangential geometric offset value of the stacking axis $\theta$ is determined so as to reduce the term corresponding to the generalized aerodynamic force $|^\tau y * f(\omega)|$, the temporal phase shift $\phi$ of the excitation pressure $f(\omega)$ being linked to the tangential geometric offset by the relation $\theta=N_{excit}*\phi$ where $N_{excit}$ is the number of exciter sources; the combination of the individual aerodynamic profiles of the p sections with the tangential offsets therefore defines a new configuration of the blades of said one of the two disks;

E—the synchronous forced response $y'(\omega)$ is calculated on the first bladed disk;

F—if $|y'(\omega)|>\alpha*|y(\omega)|$, the calculation at D is repeated with new tangential geometric offset values to be applied to the stacking axis;

G—if $|y'(\omega)| < \alpha * |y(\omega)|$, the new configuration is applied to at least a portion, and more particularly to all, of the blades of said one of the two disks.

More particularly, the invention allows the treatment of various cases:

The first bladed disk is in the wake of the second bladed disk.

The first bladed disk is upstream of the second disk.

The invention is the result of the theoretical analysis of vibration phenomena. It is shown that the forced response $y(\omega)$, of a linear structure subjected to a harmonic excitation force $f(\omega)$, is associated with the latter by a relation which may be formulated with complex terms in the manner expressed below under the hypothesis of a unit norm of the Eigen vectors relative to the weight:

$$y(\omega) = F({}^T y_\upsilon * f(\omega)) = \sum_{\upsilon=1}^{n} [y_\upsilon * {}^T y_\upsilon / (\omega_\upsilon^2 - w^2 + j * \omega * \beta_\upsilon)] * f(\omega w) \quad (1)$$

where the symbol $\Sigma$ means that the forced response $y(\omega)$ is the sum of the forced responses of each of the fundamental modes of vibration $\upsilon$ to the pulsation $\omega$. The forced response for a determined fundamental mode of vibration is given by the relation between square brackets. The sum takes account of all of the n fundamental modes of vibration $\upsilon$ taken into consideration and that have to be treated, that is to say from the fundamental mode of vibration $\upsilon=1$ to the fundamental mode of vibration $\upsilon=n$.

$y_\upsilon$ corresponds to the mode shape of the mode $\upsilon$ under the hypothesis of a unit norm of the Eigen vectors relative to the weight, ${}^T y_\upsilon$ corresponds to the transpose of the preceding vector, $\omega_\upsilon$ corresponds to the pulsation of the fundamental mode of vibration $\upsilon$, $\omega$ corresponds to the pulsation of the excitation, $j^2=-1$, $\beta_\upsilon$ corresponds to the generalized modal damping for the fundamental mode of vibration $\upsilon$,

. . .

and $f(\omega)$ is the harmonic excitation force; itself in the form $f*\cos(\omega*t+\phi)$ where t is time and $\phi$ the temporal phase shift.

In the case of an excitation of aerodynamic origin applied to a bladed disk, the term ${}^T y_\upsilon * f(\omega)$ represents the generalized aerodynamic force for the fundamental mode of vibration $\upsilon$.

The treatment of the vibration phenomena includes, as part of the invention, the implementation of the means making it possible to reduce the modulus $|y(\omega)|$.

Although to minimize the modulus $|y(\omega)|$ of the forced response subjected to the excitation force $f(\omega)$ the aim is usually to increase the factor $\beta_\upsilon$ associated with the damping for the fundamental mode of vibration $\upsilon$, the efforts, according to the present invention, have been applied to reducing the modulus of the term corresponding to the generalized aerodynamic force of each of the fundamental modes of vibration $\upsilon$.

A procedure for achieving this consists in modifying the stacking axis of the blades studied in the direction tangential to the axis of rotation. The profile of the airfoil of a blade is defined geometrically based on the individual aerodynamic profiles of each of the sections parallel with one another produced between the root of the blade and its tip. The sections therefore form a stack along a curve that is designated the stacking axis. The profiles are determined aeromechanically.

The procedure began with the hypothesis that, for a determined section, a modification in the tangential direction leaves the moduli of the instationary pressures unchanged for low variations (as an example, of the order of one degree for a disk consisting of 150 sectors).

This therefore makes it possible to directly link the temporal phase $\phi$ of the pressures to the tangential difference $\theta$ relative to the stacking axis for each section of the blade. With the following relation, the equivalence between the temporal phase shift on the pressures and the geometric phase shift, that is to say the tangential movement to be applied to the blade $\phi=\theta*N_{excit}$, is established where $\phi$=temporal phase shift;

$\theta$=geometric phase shift;

$N_{excit}$=number of exciter blades.

BRIEF DESCRIPTION OF THE DRAWINGS

The procedure according to the invention is described in greater detail below with reference to the figures in which.

DESCRIPTION OF THE PREFERRED EMBODIMENTS

Figure 1:
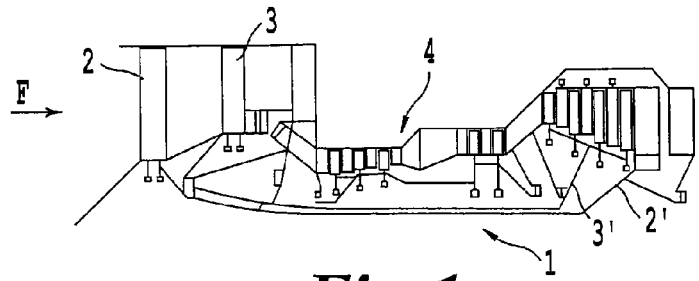
FIG. 1 represents schematically an example of a structure of a turbine engine with contrarotating rotors.

FIG. 1 represents a structure of a multiple-spool turbine engine 1, in this instance a turbojet with contrarotating fans. A first front fan 2 is driven by a first turbine 2' via a first shaft connecting the two rotors. A second fan 3 is placed immediately downstream of the fan 2. It is driven by a second turbine 3' via a second shaft connecting them. This engine comprises a third spool housed between the two fans, 2 and 3, and the two turbines, 2' and 3'. Since the two fans are contrarotating, a source of excitation of the fan blades originates from the wakes and the pressure fluctuations generated by the obstacles formed by the blades of the upstream and downstream stages.

Figure 2:
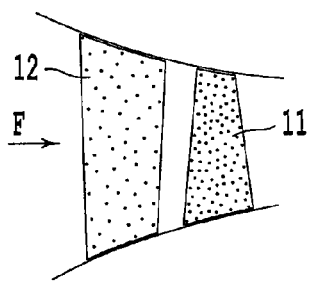
FIGS. 2 and 3 show two cases that it is possible to treat according to the invention.

As reported above, the relative movement of one disk relative to the other inside an axial gaseous flow, represented by the arrow F, is a source of turbulence. For example, with reference to FIG. 2, a first moveable disk 11 sustains the influence of a second fixed bladed disk 12 by being in its wake. This wake is the source of turbulence on the first moveable disk 11.

Figure 3:
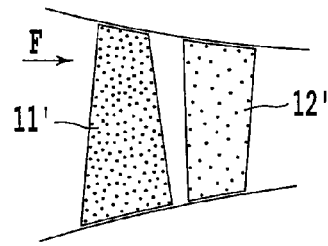

Other cases are possible in the context of the invention; in FIG. 3, consideration is given to a first moveable bladed disk 11' in its position upstream of the second disk 12' and which sustains the exciter forces generated by this second downstream disk 12'.

Other cases are covered by the present invention; it is not limited to adjacent disks.

The aerodynamic profile of a blade and of its airfoil in particular is determined by a plurality of sections made in the radial direction between the root and the tip. The individual aerodynamic profile of a plurality of sections $c_1, c_2, c_3, \ldots c_p$ (p being of the order of 20) is defined geometrically through tangential planes p1, p2, . . . $p_p$ along this radial direction.

According to the invention, the modulus of the forced response $y(\omega)$ of the blades of a first bladed disk is reduced by seeking an adequate distribution of the pressure components in order to minimize the modulus of the generalized aerodynamic force associated with each of the fundamental modes of vibration $\upsilon$.

Specifically, as results from the formula (1) reported above, the generalized aerodynamic force associated with a fundamental mode of vibration is a multiplying factor which appears in each of the terms of the sum $\Sigma$.

It should be noted that the excited blade is not necessarily modified. It is sufficient to act on one of the blades either forming the source of excitation or being excited by the source of excitation.

Figure 4:
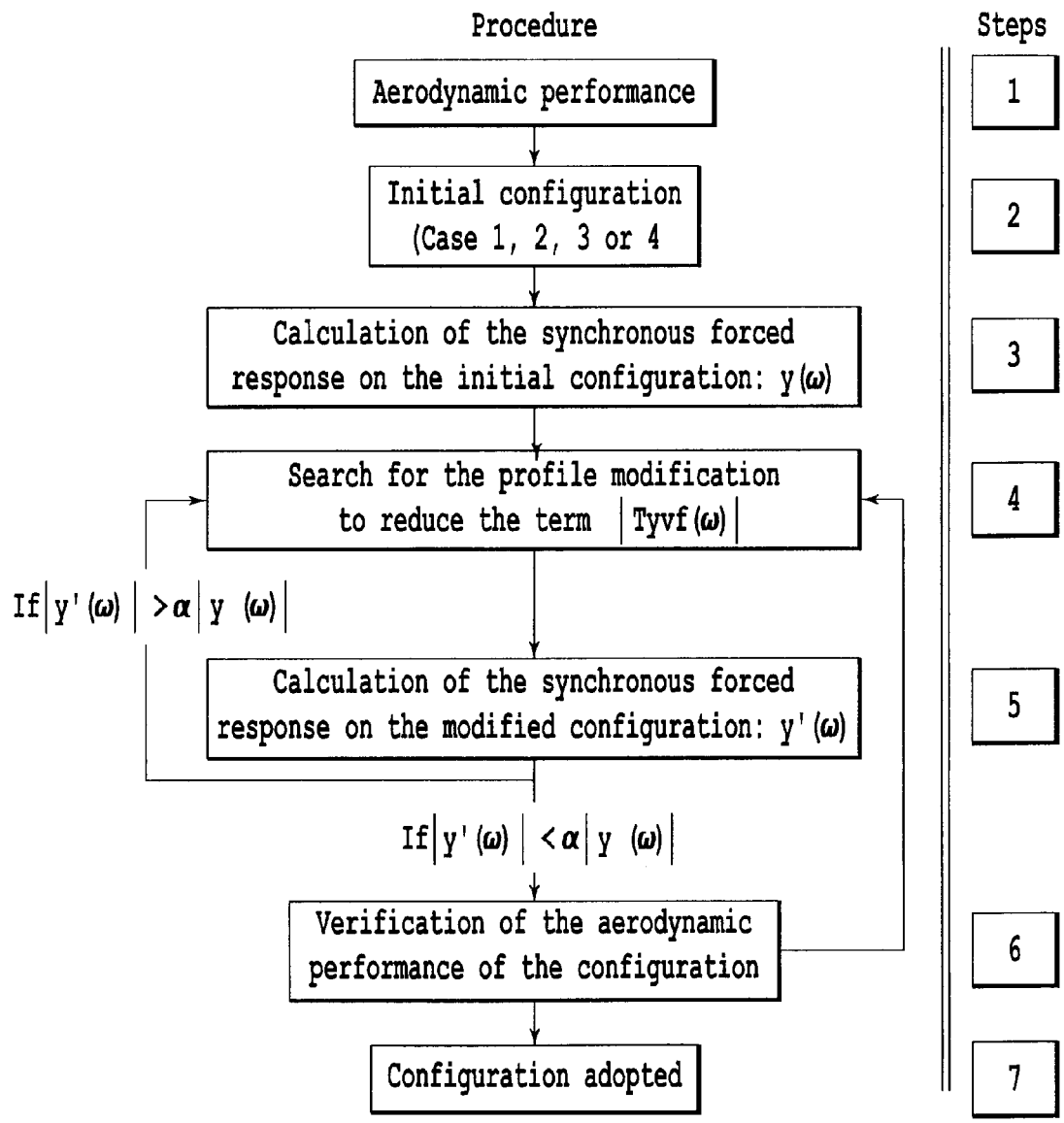
FIG. 4 is a flow chart of the various steps of the method according to the invention.

The procedure is developed below with respect to the flow diagram of FIG. 4.

The first two steps involve defining the specifications in terms of aerodynamic performance of the structure comprising the two bladed disks, then in calculating the initial configuration of the bladed disks. This configuration comprises the profiles of the sections $c_1, \ldots c_p$ and of their stacking. The procedure is usually via aerodynamic iterations as is known to those skilled in the art.

Step 3: the aeroelastic forced response $y(\omega)$ is calculated on the blading having the initial configuration excited with a synchronous aerodynamic excitation $f(\omega)$:

The excitation is determined with the aid of instationary aerodynamic calculation;

An aeroelastic forced response calculation (defined by the relation (1)) is then made in order to determine the vibration levels;

The criticalness of these vibration levels is determined with the aid of a Haigh diagram. This diagram, defined for a given material, makes it possible to define, for a given static stress, the acceptable dynamic stress in order to have an infinite vibrational service life.

If the predicted (or measured under test) vibration levels are considerable relative to experience, a target $\alpha^*|y(\omega)|$ (where $0<\alpha<1$) is defined in terms of maximum vibration level.

It is necessary to ensure that alpha is the smallest possible value taking account of the manufacturing tolerances.

Step 4: the procedure according to the invention is applied with the above maximum vibration level as the target.

The modulus of the aeroelastic forced response is minimized for a given mode knowing that it can be extended to any mode.

Figure 5:
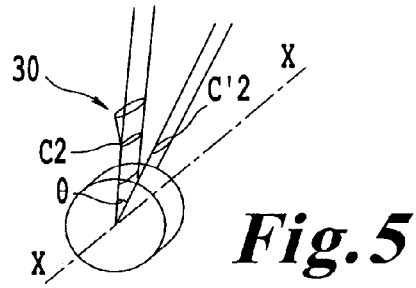
FIG. 5 shows the definition of the angle $\theta$ of tangential offset of a section defined relative to the axis of rotation.

The method consists in determining the geometric offset $\theta$, illustrated in FIG. 5, applied to the tangential stacking axis of an airfoil 30 in order to minimize the vibrational response due to the turbulence, such as the wake. A programming of the tangential offset to be applied to the blade profile to be modified is adopted. In FIG. 5, the calculation is made on a section, c2 for example. The value of $\theta$ which leads to angularly offsetting the section at c'2 is determined.

For this, techniques of the spline/poles or any discrete shape basis type or chosen to project the stacking law are used for example.

Any optimization method may be used. As an example, here are some conventional methods: the gradients method, the method called the "simulated annealing" method, the genetic method etc. (the magnitude to be minimized is the modulus $|{}^T y_\upsilon * f(\omega)|$ or the total of the moduli in the case of a multimode optimization).

Step 5: an aeroelastic forced response $y'(\omega)$ is calculated on the modified blading in order to verify that the target in terms of maximum vibration level is indeed achieved. If it is not, a new profile definition is defined.

Step 6: once the target is achieved, the user verifies that the aerodynamic performance is preserved by the modification of the stacking axis of the blade concerned.

Step 7: the new definition of the blading is adopted; it satisfies the aerodynamic criteria in terms of performance and the mechanical criteria in terms of vibration levels.

The sections c1, c2 . . . are not modified aerodynamically. They have each sustained a tangential offset about the axis of the turbine engine.

Figure 6:
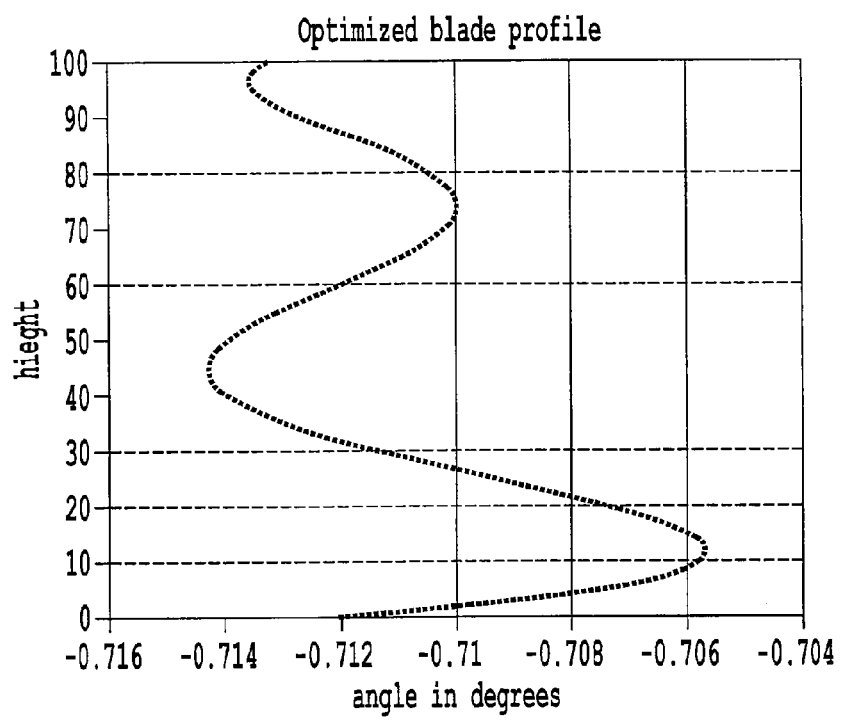
FIG. 6 is a graph illustrating an example for a blade profile of the values of the angle of tangential offset.

FIG. 6 shows a graph showing an example of an optimized blade profile; each dot represents the value of the angle $\theta$ for each of the sections $c_1$ to $c_p$ over the whole height of the airfoil of the blade. It is noted that this value remains relatively low, less, according to this example, than 1 degree relative to the position corresponding to the initial configuration.

To the extent that the correction values are greater than the manufacturing tolerances of the blades, the user has a means for reducing the vibration levels without adding weight or modifying the aerodynamic performance of the turbine engine and the technological interfaces of the bladings.

The invention claimed is:

1. A method for reducing the vibration levels in a turbine engine comprising a first moveable bladed disk and a second moveable bladed disk, forming a propfan of contrarotating disks, because of the turbulence of aerodynamic origin generated by the second bladed disk on the first bladed disk, said method comprising:

A—defining an initial configuration of the blades as a function of an expected performance of the turbine engine, with individual aerodynamic profiles of p sections (c1, c2, . . . cp) stacked radially between a root and a tip of said blades;

B—calculating, in a computer, a synchronous forced response $y(\omega)$ on the first bladed disk as a function of a harmonic excitation force $f(\omega)$ generated by the second bladed disk based on a relation $y(\omega)=F({}^T y_\upsilon * f(\omega))$, where F is a linear function of a generalized aerodynamic force ${}^T y_\upsilon * f(\omega)$ for a fundamental mode of vibration $\upsilon$ in question;

C—defining, in a computer, a coefficient ($\alpha<1$) of reduction of the synchronous forced response $y(\omega)$;

D—determining, in a computer, for each of said p stacked sections (c1, c2, . . . cp) of one of the two disks, a tangential geometric offset value $\theta$ of the individual aerodynamic profile so as to reduce a term corresponding to the generalized aerodynamic force associated with the fundamental mode of vibration $\upsilon|{}^T y * f(\omega)|$, a temporal phase shift $\phi$ of an excitation pressure $f(\omega)$ being linked to a tangential geometric offset by a relation $\theta = N_{excit} * \phi$ where $N_{excit}$ is the number of exciter sources; the combination of the p sections with the tangential offsets therefore defines a new configuration of the blades of said one of the two disks;

E—calculating, in a computer, a synchronous forced response $y'(\omega)$ on the first bladed disk;

F—if $|y'(\omega)|>\alpha^*|y(\omega)|$, repeating, in a computer, the calculation at D with new tangential geometric offset values;

G—if $|y'(\omega)|<\alpha^*|y(\omega)|$, manufacturing at least a portion of the blades of said one of the two disks with the new configuration and employing the blades in the propfan; and H—operating the propfan with reduced vibration levels.

2. The method as claimed in the claim 1, wherein $$y(\omega) = F(^T y_\upsilon * f(\omega)) = \sum_{\upsilon=1}^{n} [y_\upsilon *^T y_\upsilon / (\omega_\upsilon^2 - \omega^2 + j*\omega*\beta_\upsilon)] * f(\omega) \quad (1)$$

where the symbol $\Sigma$ means that the forced response $y(\omega)$ is the sum of the forced responses of each of the fundamental modes of vibration $\upsilon$ to the pulsation $\omega$, $y_\upsilon$ corresponds to a mode shape of the mode $\upsilon$ under the hypothesis of a unit norm of Eigen vectors relative to a weightun, $^T y_\upsilon$ corresponds to a transpose of the preceding vector, $\omega_\upsilon$ corresponds to a pulsation associated with the mode $\upsilon$, $\omega$ corresponds to a pulsation of the excitation, $j^2 = -1$, $\beta_\upsilon$ corresponds to a generalized modal damping for the mode, and $f(\omega)$ is the harmonic excitation force in the form $f*\cos(\omega*t+\phi)$ where t is time and $\phi$ the temporal phase shift.

3. The method as claimed in claim 2, wherein the first disk is in a wake of the second bladed disk.

4. The method as claimed in claim 2, wherein the first bladed disk is upstream of the second bladed disk.

5. The method as claimed in claim 1, wherein the first disk is in a wake of the second bladed disk.

6. The method as claimed in claim 1, wherein the first bladed disk is upstream of the second bladed disk.

\* \* \* \* \*